No. 639,405. Patented Dec. 19, 1899.
A. W. KNIGHT.
HORSESHOE NAIL.
(Application filed Dec. 28, 1897.)

(No Model.)

Witnesses.
J. D. Kingsbury
L. C. Hills

Inventor.
Alfred W. Knight
By Whitaker & Prevost
attys.

THE NORRIS PETERS CO., PHOTO-LITHO., WASHINGTON, D. C.

UNITED STATES PATENT OFFICE.

ALFRED WILLIAM KNIGHT, OF LONDON, ENGLAND.

HORSESHOE-NAIL.

SPECIFICATION forming part of Letters Patent No. 639,405, dated December 19, 1899.

Application filed December 28, 1897. Serial No. 663,938. (No model.)

*To all whom it may concern:*

Be it known that I, ALFRED WILLIAM KNIGHT, a subject of the Queen of Great Britain, residing at London, England, have invented certain new and useful Improvements in Horseshoe-Nails; and I do hereby declare that the following is a full, clear, and exact description of my invention, such as will enable others skilled in the art to which it appertains to make and use the same.

My invention consists in the novel features hereinafter described, reference being had to the accompanying drawings, which illustrate one form in which I have contemplated embodying my invention and a slight modification of the same, and said invention is fully disclosed in the following description and claims.

Figure 1:
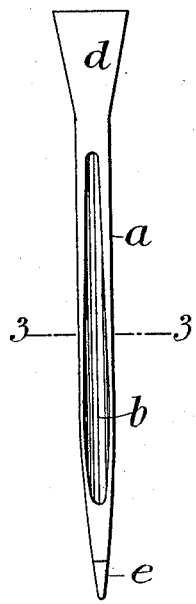
Figure 2:
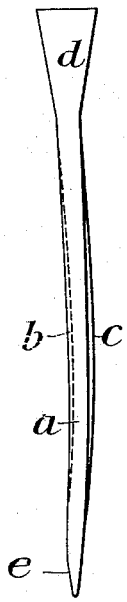
Figure 3:
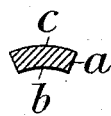
Figure 4:
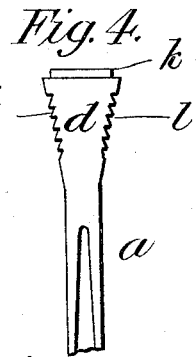
Figure 5:
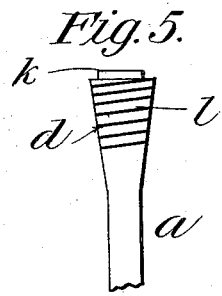

Referring to the drawings, Figure 1 represents an inner face view of a nail embodying my invention. Fig. 2 is an edge view of the same. Fig. 3 is a transverse sectional view on line 3 3 of Fig. 1. Figs. 4 and 5 are face and edge views of a portion of a nail embodying a slight modification of my invention.

In the drawings, $a$ represents the shank of my improved nail provided with a head $d$. The nail is curved longitudinally from one end to the other, the outer side of the nail when in the position it occupies in the hoof being the outer side of the curve. The main portion of the shank $a$ of the nail is also curved transversely, the outer side or face $c$ being convex and the inner side being concave, forming the groove $b$. The outer portion of a horse's hoof, into which the nails are driven, is curved, and the strata or layers of the horn or outer shell of the hoof extend in a curved direction around the hoof. If a nail having plain outer and inner faces is driven upward through the hoof, its central portion will be closer to the tender portion of the hoof, which is inside of the outer shell, than the lateral portions and will tend to splinter the hoof in driving the nail and also to exert an irritating pressure on the sensitive portion.

The object in making my nail convex on the outer side and concave on the inner side is to enable it to lie parallel to the layers of the hoof when driven, thus enabling the nail to penetrate between the strata of the hoof without splintering and relieving the sensitive part from pressure, since the lateral or transverse curvature of the nail conforms to the curvature of the layers of the shell of the hoof.

In practice I make the transverse convexity and concavity of the nail slightly greater than the ordinary curvature of the hoof, and the concave face of the nail is narrower transversely than the convex side, so that the lateral edges of the nail are inclined to each other.

The head $d$ of the nail is preferably so formed that it projects an equal distance beyond the shank upon both sides, and the point is beveled on the inner or concave face of the nail, as shown at $e$.

It will be found when using a nail of this kind that it will penetrate the crust of the hoof without cracking the same, or with less cracking than heretofore. Also when the point is bent over for the clench the concave face of the nail is bent outward, so that by rasping the edges of the flute will be removed, the clench being thus thicker at the center than at the sides, whereby when clenched onto the hoof it will readily embed itself. Also the concave side of the nail being narrower than the convex side, the clench will not be so conspicuously large as an ordinary clench.

It will be readily understood that the concavo-convex form of nail described possesses more strength than a flat nail, so that it will not so readily bend and can be driven with more safety than the ordinary nail, as the flute is felt in holding it and determines the bevel of the point, thereby avoiding the necessity of seeing the point. Nails made as described may be made thinner for holding a given shoe than ordinary nails.

In practice I prefer to form the heads of my nails with small projections or crowns $k$, as shown in Figs. 4 and 5, so as to insure that the blows delivered to drive the nails shall act upon the nail more centrally than is the case with flat-headed nails if the hammer does not strike the head quite fairly or flat. Also I prefer to curve the nail-shanks longitudinally to enable them to hold more firmly than a straight nail. By forming the shank centrally with the head, as hereinbefore described, I render the driving of my improved nails more easy than the driving of ordinary nails having the shank at one side of the center of the head, as I avoid the excessive bending of the nails which takes place when ordinary nails are used in grooved shoes.

In order to facilitate the withdrawal of nails from grooved shoes, I advantageously provide the sides of my nail-heads with notches $l$, arranged obliquely, as shown in Figs. 4 and 5, to enable the head to be readily grasped by pincers.

Having now particularly described and ascertained the nature of my said invention and in what manner the same is to be performed, I declare that what I claim is—

1. A horseshoe-nail curved longitudinally, the outer face of the nail being the outer side of the curve, the shank of said nail being curved transversely, the outer face being convex and the inner face concave, said nail having its point beveled on the inner or concave side, whereby when driven into the hoof the outer and inner faces of said nail will be substantially parallel to the outer face of the hoof, substantially as described.

2. A horseshoe-nail curved longitudinally, the outer face of the nail being the outer face of the curve, the shank of said nail having its inner face concave, its outer face convex and of greater width than the inner face, said nail having lateral edges connecting the outer and inner faces and lying at an angle to each other, a central raised portion on the head to engage the hammer and inclined faces adjacent to the head provided with transverse notches, substantially as described.

In witness whereof I have hereunto set my hand in the presence of two witnesses.

ALFRED WILLIAM KNIGHT.

Witnesses:
   A. E. WILLIAMS,
   CHAS. BAUER.